United States Patent [19]

Faul

[11] Patent Number: 5,323,286
[45] Date of Patent: Jun. 21, 1994

[54] METHOD OF DETERMINING TAPE LENGTH AND TAPE PACK POSITION OF A TAPE CASSETTE

[75] Inventor: Ivan Faul, San Jose, Calif.

[73] Assignee: Xerox Corporation, Stamford, Conn.

[21] Appl. No.: 999,347

[22] Filed: Dec. 31, 1992

[51] Int. Cl.$^5$ .............................................. G11B 15/02
[52] U.S. Cl. ..................................................... 360/137
[58] Field of Search ...................... 360/137, 96.3, 132; 242/197-200

[56] References Cited

U.S. PATENT DOCUMENTS

| | | | |
|---|---|---|---|
| 4,805,054 | 2/1989 | Kamoto et al. | 360/97.01 |
| 4,989,107 | 1/1991 | Tsukahara | 360/99.08 |
| 5,018,040 | 5/1991 | Nishida | 360/137 |
| 5,146,380 | 9/1992 | Fujii et al. | 360/132 |
| 5,150,265 | 9/1992 | Tanaka | 360/96.3 |

FOREIGN PATENT DOCUMENTS

| | | | |
|---|---|---|---|
| 59-58644 | 4/1984 | Japan | 360/137 |
| 61-126654 | 6/1986 | Japan | 360/137 |
| 62-18691 | 1/1987 | Japan | 360/137 |
| WO8800386 | 1/1988 | PCT Int'l Appl. | 360/137 |

*Primary Examiner*—John H. Wolff
*Assistant Examiner*—David D. Davis
*Attorney, Agent, or Firm*—Dan O'Neill; Nola Mae McBain

[57] ABSTRACT

A method of determining the position of a tape in a tape cartridge having a first hub, a second hub, a means for measuring the rotation of the first hub, a means for measuring the rotation of the second hub, and a length of tape with one end of the tape wrapped around the first hub and the other tape end wrapped around the second hub, the tape having a relatively uniform and predetermined thickness and the hubs having predetermined diameters. In accordance with the method, the first hub is locked to prevent rotation of the first hub. A length of tape is then extracted from the cartridge, which causes the second hub to rotate as tape is unwound from the second hub. There is then determined the angle rotated by the second hub in response to the length of tape being unwound from the second hub. The first hub is unlocked and the second hub is locked. The length of tape unwound from the second hub is wound onto the first hub, and there is determined the angle rotated by the first hub in response to the length of tape being wound onto the first hub. Finally, the position of the tape in the tape cartridge is calculated based on the predetermined thickness of the tape, the predetermined diameters of the empty hubs, and the angle of rotations determined for the second hub and for the first hub.

4 Claims, 3 Drawing Sheets

METHOD OF DETERMINING TAPE LENGTH AND TAPE PACK POSITION OF A TAPE CASSETTE

The present invention relates to recording tape cartridges, and more particularly to a method of determining the length and pack position of the tape in a recording tape cartridge.

BACKGROUND

Magnetic tape and its recent companion, optical tape, are used to store large amounts of data (both digital and analog) at a cost that is significantly less than other competing forms of mass storage, such as magnetic floppy disks, hard disk drives, or write once, read many (WORM) drives. Perhaps as a result, tape drives are often used to backup (i.e., to copy one or more files or programs for archival purposes) the other forms of mass storage. The backup tapes are conveniently packaged in cartridges of standard dimensions, such as VHS and DAT (digital audio tape). The cartridges protect the tape from dirt and other contaminants, store the tape in a convenient form, and allow a user to readily change the tapes in a tape drive without the need to thread the tape onto a reel.

Besides backing up other forms of mass storage, tape has not found widespread use as a medium for storing multiple files of data. The other forms of mass storage are preferred over tape storage because, among other reasons, tape storage requires significantly more time to access data. With tape, accessing a particular file may require forwarding (or rewinding) through most of the tape, a linear process. In contrast, with a optical or magnetic disk drive the reading head can access a particular disk location by moving in two dimensions, either spiraling along a track, or moving radially to cut across tracks.

At present as a prelude to accessing data on a tape, most tape drives rewind a tape when the tape is initially inserted into the drive. (The beginning or end of tape in most cartridge tapes is indicated by a material that can be sensed by the tape drive, a provision that simplifies rewinding a tape.) Knowing what track the particular file begins on, the drive could access the file by moving the tape at a normal speed (e.g., 0.32 inches per second (ips) for a DAT) past a transducer which is typically a rotating helical scan head. The head would scan over each track, reading the number of the sequentially numbered tracks (the track number being part of the overhead associated with the data of each track). When the drive reached the appropriately numbered track, the drive would begin reading data.

In reality, a faster method is used to locate the beginning track of a particular file. The tape drive first locates the approximate position of the beginning track by performing a "fast forward" read. With the fast forward read, the tape moves past the transducer head at about 60 ips, with little change in the scanning speed of the rotation head. Consequently the head does not read the track number of every track. Upon reaching the vicinity of the starting track of a file, the drive resumes a normal reading of track numbers so that the beginning track of the file can be precisely located.

While the above method is generally adequate, there is a need for a faster method for determining the initial position of a tape in a tape cartridge.

SUMMARY OF THE INVENTION

A method of determining the position of a tape in a tape cartridge having a first hub, a second hub, a means for measuring the rotation of the first hub, a means for measuring the rotation of the second hub, and a length of tape with one end of the tape wrapped around the first hub and the other tape end wrapped around the second hub, the tape having a relatively uniform and predetermined thickness and the hubs having predetermined diameters. In accordance with the method, the first hub is locked to prevent rotation of the first hub. A length of tape is then extracted from the cartridge, which causes the second hub to rotate as tape is unwound from the second hub. There is then determined the angle rotated by the second hub in response to the length of tape being unwound from the second hub. The first hub is unlocked and the second hub is locked. The length of tape unwound from the second hub is wound onto the first hub, and there is determined the angle rotated by the first hub in response to the length of tape being wound onto the first hub. Finally, the position of the tape in the tape cartridge is calculated based on the predetermined thickness of the tape, the predetermined diameters of the empty hubs, and the angle of rotations determined for the second hub and for the first hub.

DESCRIPTION OF THE PREFERRED EMBODIMENTS

Figure 1:
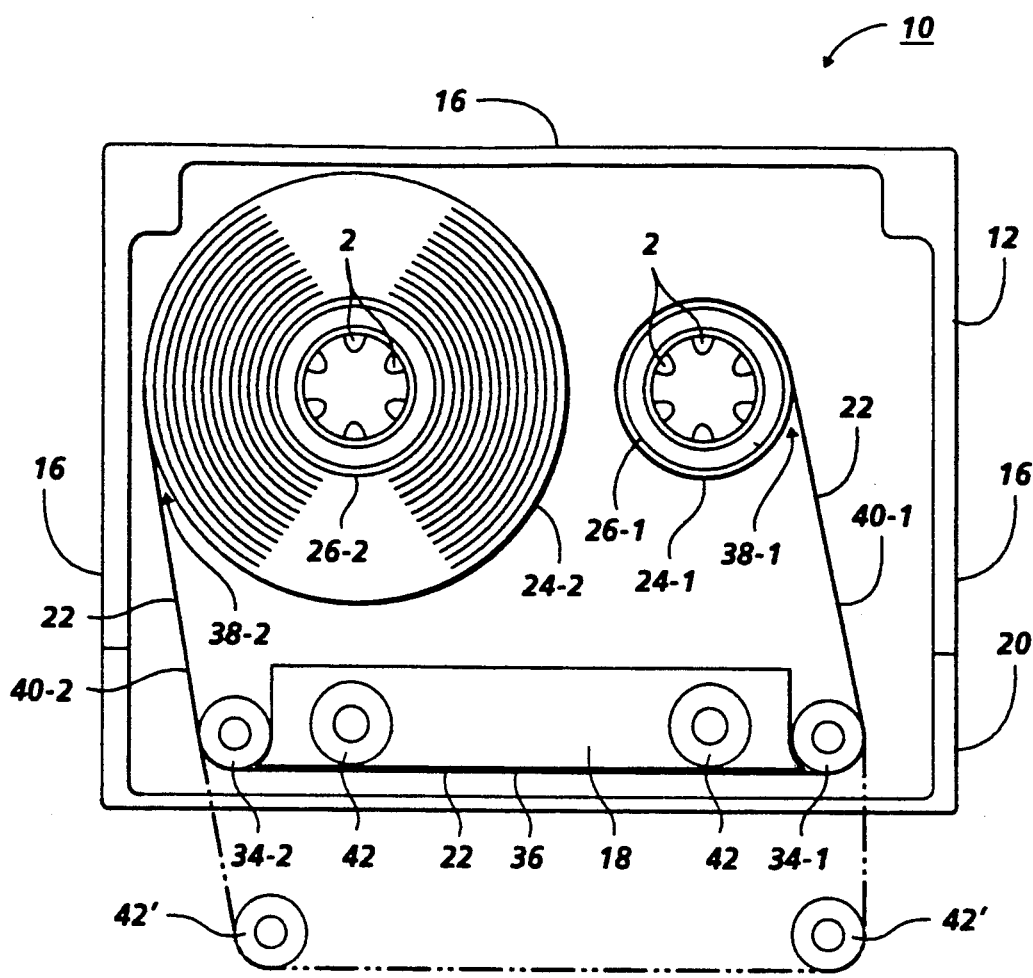
FIG. 1 is a schematic illustration of a cut away plan view of a cartridge tape employed by the method of the present invention.
Figure 2:
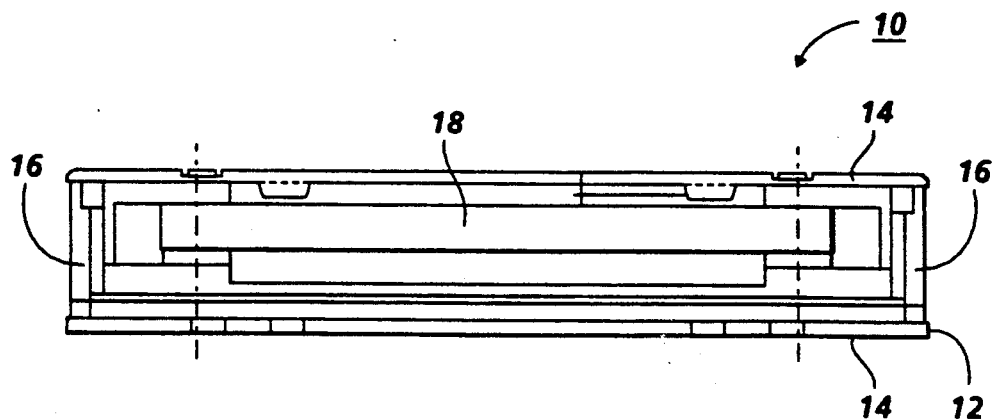
FIG. 2 is a schematic illustration of a side view of the cartridge tape of FIG. 1.
Figure 3:
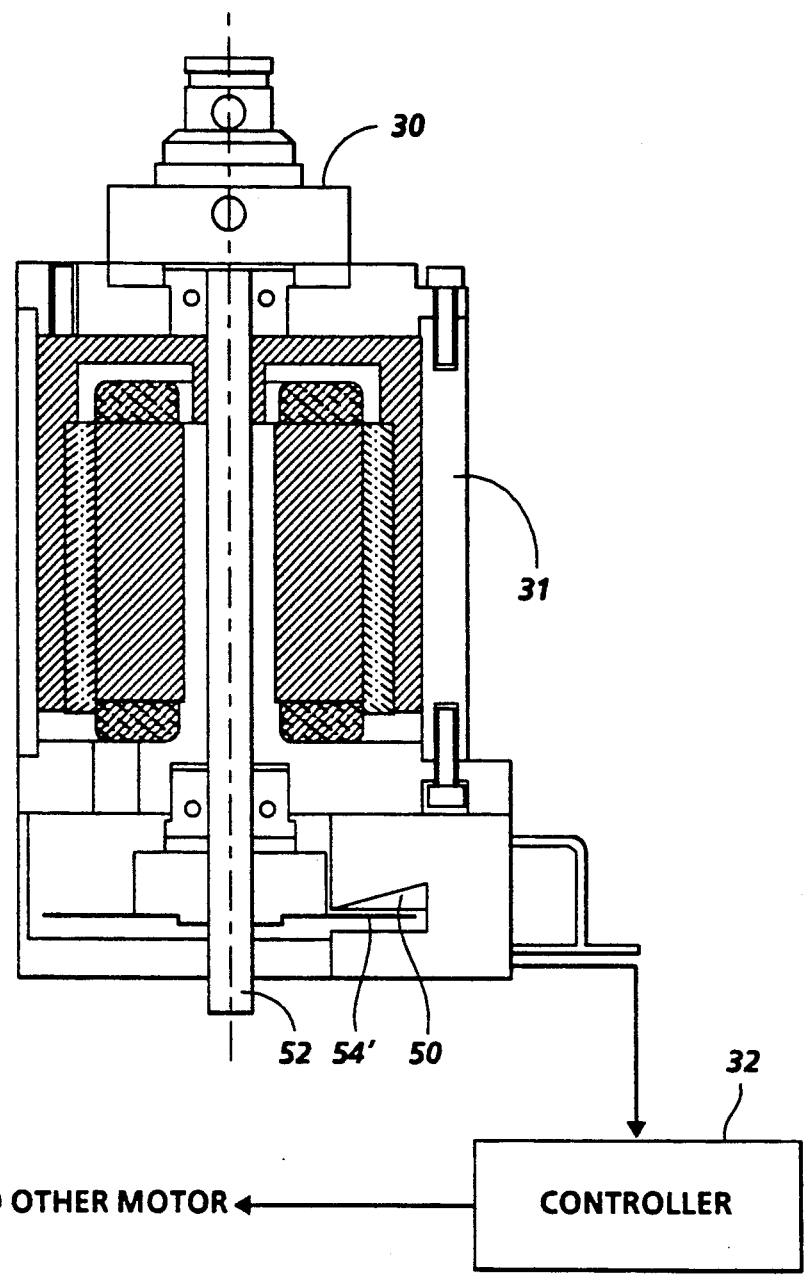
FIG. 3 is a schematic illustration of a direct drive motor and controller of the tape drive of FIG. 1.

Referring now to FIGS. 1, 2, and 3 there is shown a cassette tape cartridge 10. Cartridge 10 includes a substantially rectangular cassette housing 12 having top and bottom walls 14. Connected between the top and bottom walls 14 are three side walls 16. Along the remaining side of housing 12 is an opening 18 that can be enclosed by a movable lid 20. Opening 18 gives access to the interior of housing 12.

A supply of tape 22 is contained in housing 12. Tape 22 is wound in packs 24-1 and 24-2 on respective supply and take-up hubs 26-1 and 26-2. Pack 24-2 is at its maximum diameter, while pack 24-1 is at its minimum diameter. Hubs 26 are disposed in a side-by-side relationship. Hubs 26 are rotatably guided at their lower ends by circular holes 28 provided in bottom wall 14 of housing 12. At their upper ends, hubs 26 are kept in the confines of housing 12 by retainers 29 that are integral with top wall 14 of housing 12. The inner surface of hubs 26 is formed with a plurality of circumferentially spaced apart, axial projections of splines 2 for rotatably coupling of hubs 26 with a respective drive shaft or spindle 30 of a tape drive (e.g., a recording or reproducing device) (not shown). Preferably the tape drive drives each spindle 30 with a separate direct drive motor 31 controlled by a controller 32.

Devices and methods for driving hubs 26 are controlling the tension of tape 22 are well known to those skilled in the art. In brief, referring now to FIGS. 1 and 3 each motor 31 includes a shaft 52 to which a spindle 30 is mounted on one end, and an encoded wheel 54 having periodic marks (not shown) (e.g., a gray scale pattern or other suitable pattern of marks well known to one skilled in the art) are inscribed on the other end. As shaft 52 rotates, marks pass by sensor 50, which detects the passage of marks and passes this information as electrical signals to controller 32, where the information is interpreted as the position of spindle 30. With knowledge of the spindle 30 position, controller 32 controls motors 31 to drive hubs 26 differentially by an amount calculated to provide the requisite tension to tape 22. Further adjustment of tape 22 tension can be provided by a motor-driven capstan (not shown) that pinches tape 22 in response to a tension sensor (not shown).

Referring now to FIGS. 1 and 2, guides 34 extend between top and bottom walls 14 at the corners of housing 12 which are at the opposite ends of opening 18. Guides 34 guide tape 22 between hubs 26 in a span 36 extending along the fourth side or opening 18 of housing 12. Between guide 34-1 and nip 38-1 of pack 24-1 is a span 40-1 of tape 22. Guide 34-1 guides tape span 40-1 on to and off of pack 24-1. Between guide 34-2 and nip 38-2 of pack 24-2 is a span 40-2 of tape 22. Guide 34-2 guides tape span 40-2 on to and off of pack 24-2.

Access to tape 22 in span 36 is achieved by raising lid 20, after which a loop 41 of tape 22 can be extracted from housing 12 and positioned against a transducer head (not shown) for recording to or reading from tape 22. Loop 41 is extracted from housing 12 by a picker 42 that inserts two guides into opening 18 to engage the back surface of span 36 of tape 22, and pull loop 41 out of housing 12. In FIG. 1, picker 42 in its extracted position is denoted as 42'.

Figure 4:
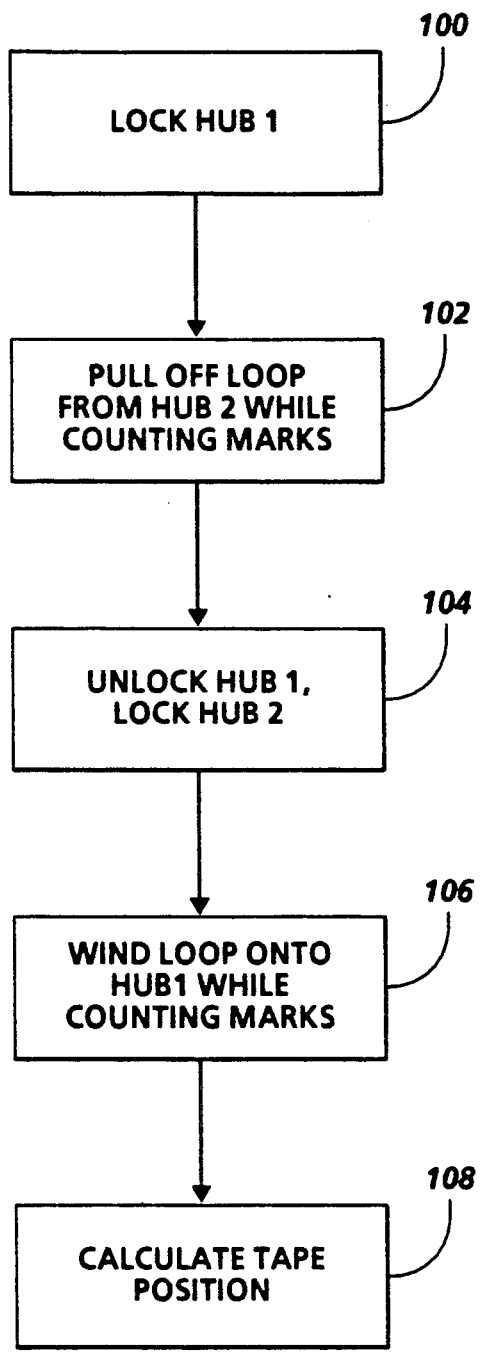
FIG. 4 is a flowchart of the steps of the method of the present invention, by which can be determined the initial position of the tape of the cartridge tape of FIG. 1.

Referring now to FIGS. 1, 3, and 4, in accordance with the invention controller 32 determines the initial position of tape 22 in cartridge 10 following the steps illustrated in the flowchart of FIG. 4. In step 100, controller 32 first locks hub 26-1 in place so that it cannot rotate. Preferably controller 32 controls motor 31 to lock hub 26-1 in place (i.e., controller 31 uses sensor 50 and encoded wheel 54 to detect movement of hub 26-1, and in responses sends impulses to motor 31 that counters this movement). Then in step 102 controller 32 orders picker 42 to engage a span 36 of tape 22 and pull a loop 41 of tape 22. Picker 42 pulls loops 41 to a preset position by which is known the length of loop 41. Meanwhile, controller 32 also controls the motor 31 engaging hub 26-2 to offer resistance against the pull sufficient to keep tape 22 from going slack, since a slack tape 22 could give a false reading of length. However, the tension maintained should not be so much as to prevent or unduly delay picker 42 from pulling tape 22 from hub 26-2. While tape 22 is being pulled from hub 26-2, controller 32 monitors the signal from the sensor 50 associated with hub 26-2. In particular, controller 32 counts the number of times marks on wheel 54 pass sensor 50, and stores the count. The count can be used to determine the angle of rotation of hub 26-1.

Next in step 104 controller 32 causes hub 26-2 to be locked in place as described above for hub 26-1. Then in step 106 picker 42 returns to its initial position, releasing the loop 41 of tape 22 that had previously been pulled from hub 26-2. Controller 32 causes hub 26-1 to turn in order to wind onto hub 26-1 the loop 41 of tape released by picker 42. As hub 26-1 turns, controller 32 monitors the signal from the sensor 50 associated with hub 26-1, counting the number of times marks on wheel 54 pass sensor 50, and stores the count. The count indicates can be used to determine the angle of rotation of hub 26-2.

Finally, in step 108 controller 32 uses stored counts of rotation of hubs 26-1 and 26-2 to the calculate the present approximate position of tape 22 in cartridge 10. One formula for this calculation is derived in the following manner:

$$C_1 = L_{span}/(\text{No. Revs. hub 1}) = L_{span}/[(n_{1d})/(n_{rev})],$$
and
$$C_2 = L_{span}/(\text{No. Revs. hub 2}) = L_{span}/[(n_{2d})/(n_{rev})]; \quad (1)$$

$$D_1 = (C_1)/(Pi), \text{ and}$$
$$D_2 = (C_2)/(Pi); \quad (2)$$

where $C_1$ and $C_2$ are the circumferences of packs 24-2 and 24-2 of hubs 26-1 and 26-2, respectively, $L_{span}$ is the length of span 40 pulled off of hub 26-1, and wound back on to hub 26-2, (no. revs. hub 1) is the number of revolutions or partial revolutions of hub 1 resulting from winding span 40 on hub 1, $n_{rev}$ is the number of marks on encoder wheel 52 passing by sensor 50 per revolution of a hub 26, and $n_{1d}$, the number of marks counted passing by sensor 50 by pulling span 40 from hub 26-2, (no. revs. hub 2) is the number of revolutions or partial revolutions of hub 2 resulting from unwinding span 40 from hub 2, $n_{2d}$ is the number of marks counted passing by sensor 50 by winding span 40 onto hub 26-1, and $D_1$ and $D_2$ are the diameters of packs 24-1 and 24-2, respectively, including the diameters of the empty hubs 26 around which the packs 24 are wound. Using the approximation that a pack 24 consists of concentric layers of tape rather than a continuous spiral, the following is true:

$$n_{1|} = (D_1)/(2*T) \text{ and}$$
$$n_{2|} = (D_2)/(2*T); \quad (3)$$

$$L_1 = \text{SUM of } n \text{ from } n_{|e} \text{ to } n_{1|} \text{ of } [2*Pi*n*T],$$
$$L_2 = \text{SUM of } n \text{ from } n_{|e} \text{ to } n_{2|} \text{ of } [2*Pi*n*T] \quad (4)$$

where:
$L_1$ is the length of the tape on pack 24-1 in inches,
$L_2$ is the length of the tape on pack 24-2 in inches,
$n_{|e}$ is the number of tape 22 layers in a pack equivalent in size to an empty hub 26, with hubs 26-1 and 26-2 assumed to have the same diameter,
$n_{1|}$ is the number of tape layers that would be in a pack equivalent in diameter to pack 24-1, but wound instead on a hub of infinitesimal diameter,
$n_{2|}$ is the number of tape layers that would be in a pack equivalent in diameter to pack 24-2, but wound instead on a hub of infinitesimal diameter, and
T is tape thickness in inches.

Alternatively, from equation (2) the length of tape 22 can be calculated using an area calculation in the following manner:

$$L_1 = Pi * [D_1/2]^2 - A_h = Pi*[L_{span}*(n_{rev})/(n_{1d}*2*Pi)]^2 - A_h$$

and $$L_2 = Pi*[D_2/2]^2 - A_h = Pi*[L_{span}*(n_{rev})/(n_{2d}*2*Pi)]^2 - A \quad (5)$$

where $A_h$ is the cross sectional area of a hub 26 itself.

The position of tape 22 relative to the beginning of the tape 22 is $L_1$. The total length of tape 22 is simply $L_1 + L_2$.

In the above method, in step 100 hub 26-1 is locked, then in step 104 hub 26-2 is locked. Alternatively the order in which hubs 26 are locked can be switched.

Under some conditions controller 32 may lock a hub 26 imperfectly. Controller 32 compensates for movement of a "locked" hub 26 by counting the number of marks passing the sensor 50 of the "locked" hub. After picker 42 has extracted loop 41, controller 32 can then return the locked hub 26 to its former position. Note that returning the locked hub 26 to its rightful position may require return movement of the other hub 26. Controller 32 reflect the return motion of the unlocked hub 26 by revising the mark count of the unlocked hub 26.

Tracking rotation of hubs 26 using sensors 50 and associated encoded wheels 54 is but one possible method. Other methods would be well known to those skilled in the art. Similarly, it would be well known to those skilled in the art to adapt equations (1)–(4) to use measures of the rotations of hubs 26 other than a count of the marks on wheels 54 passing sensors 50.

While the invention has been described with reference to the structures disclosed, it is not confined to the specific details set forth, but is intended to cover such modifications or changes as may come within the scope of the following claims.

I claim:

1. A method of determining the position of a tape in a tape cartridge, the tape cartridge having a first hub, a second hub, a means for measuring the rotation of the first hub, a means for measuring the rotation of the second hub, and a length of tape with one end of the tape wrapped around the first hub and the other tape end wrapped around the second hub, the tape having a relatively uniform and predetermined thickness and the hubs having predetermined diameters, the method comprising the steps of:
    (a) locking the first hub to prevent rotation of the first hub;
    (b) extracting a predetermined length of tape from the cartridge, thereby causing the second hub to rotate as tape is unwound from the second hub;
    (c) determining the angle rotated by the second hub in response to the length of tape being unwound from the second hub in step (b);
    (d) unlocking the first hub and locking the second hub to prevent rotation of the second hub;
    (e) winding onto the first hub the length of tape unwound from the second hub in step (b);
    (f) determining the angle rotated by the first hub in response to the length of tape being wound onto the first hub in step (e); and
    (g) calculating the position of the tape in the tape cartridge based on the predetermined thickness of the tape, the predetermined diameters of the empty hubs, and the angle of rotation determined for the second hub in step (c) and for the first hub in step (f).

2. The method of claim 1, wherein the step (c) of determining the angle rotated by the second hub includes the step of compensating for rotation of the first hub, if any, in step (b), and the step (f) of determining the angle rotated by the first hub includes the step of compensating for rotation of the second hub, if any, in step (e).

3. The method of claim 1, wherein the cross sectional area of a hub is known, and step (g) of calculating the position of the tape includes calculating the tape position using the following formula:

$$L_1 = Pi*[(L_{span}*(\text{No. Revs. hub 1}))/(2*Pi)]^2 - A_h$$

where
  $L_1$ is the length of the tape on the first hub,
  (No. Revs. hub 1) is the number of revolution of hub 1,
  $A_h$ is the cross sectional area of a hub, and
  $L_{span}$ is the length of tape pulled off of the second hub, and wound back on to the first hub 4. The method of claim 1, wherein the cross sectional area of a hub is known, and step (g) of calculating the position of the tape includes calculating the tape position using the following formula:

$$L_1 = \text{SUM of } n \text{ from } n_{|e} \text{ to } n_{1|} \text{ of } [2*Pi*n*T],$$

where
  $L_1$ is the length of the tape on the first hub,
  $n_{|e}$ is the number of tape layers in a pack equivalent in size to the first hub,
  $n_{1|}$ is the number of tape layers that would have been on the first hub pack were the first hub diameter negligible, and
  T is tape thickness in inches.

* * * * *